United States Patent [19]

Fletcher et al.

[11] 4,061,029
[45] Dec. 6, 1977

[54] FLOW SEPARATION DETECTOR

[76] Inventors: James C. Fletcher, Administrator of the National Aeronautics and Space Administration, with respect to an invention of George C. Mateer, Los Gatos, Calif.; Aviel Brosh, Haifa, Israel

[21] Appl. No.: 712,419

[22] Filed: Aug. 6, 1976

[51] Int. Cl.[2] .......................................... G01C 21/00
[52] U.S. Cl. ................................ 73/180; 340/27 SS
[58] Field of Search ................... 73/147, 178 R, 180, 73/188, 189, 204; 340/27 SS

[56] References Cited

U.S. PATENT DOCUMENTS

| 2,431,241 | 11/1947 | Goodsey, Jr. et al. ............... 73/178 |
| 2,496,339 | 2/1950 | Giers et al. ........................... 73/188 |
| 3,075,515 | 1/1963 | Richards .............................. 73/204 |
| 3,196,679 | 7/1965 | Howland .............................. 73/204 |
| 3,500,686 | 3/1970 | Bell ...................................... 73/204 |
| 3,677,085 | 7/1972 | Hayakawa ............................ 73/204 |
| 3,995,480 | 12/1976 | Edgerton ............................. 73/188 |

Primary Examiner—Herbert Goldstein
Attorney, Agent, or Firm—Darrell G. Brekke; Armand McMillian; John R. Manning

[57] ABSTRACT

An arrangement for sensing the fluid separation along a surface employs a thermally insulating element having a continuous surface blending into and forming a part of the fluid flow surface. A heating conductor is mounted on the element at the element surface. Two thermal sensors each has a conductor, the sensor conductors being mounted at the element surface on opposite sides of the heating conductor. In operation a fluid flow along the surface in a direction successively through the conductors carries heat in its wake to the downstream conductor where it is sensed. The upstream sensor also senses the temperature of the fluid flow before it reaches the heating conductor. When the fluid flow separates from the surface at the area of the heating and sensing conductors, a sudden decrease in the temperature of the downstream sensor conductor and concomitant increase in the temperature of the upstream sensor conductor is an indication of the separation. When the temperatures are returned to the state achieved during normal flow, the indicator thereby indicates the normal, attached fluid flow. The conductors may be, for example, wires or thin films, and should be within the viscous sub-layer of the expected fluid flow. The use of an upstream sensor conductor with the downstream sensor conductor is desirable as tending to compensate for changes in the free or ambient temperature of the fluid in the flow. A single heater and several pairs of sensors and corresponding sensor conductors may be used to detect not only the fluid flow and the separation, but the direction of the fluid flow, over the fluid flow surface.

9 Claims, 9 Drawing Figures

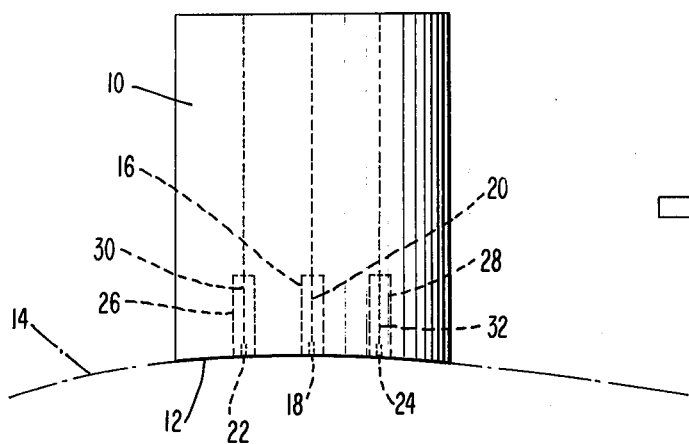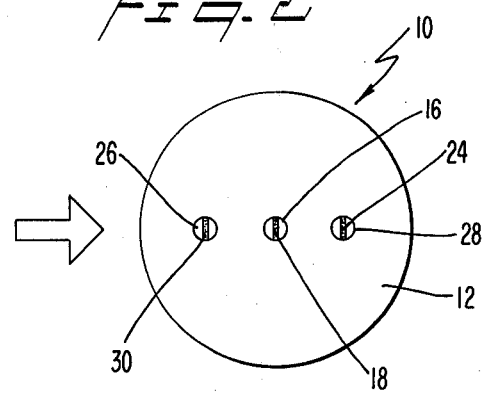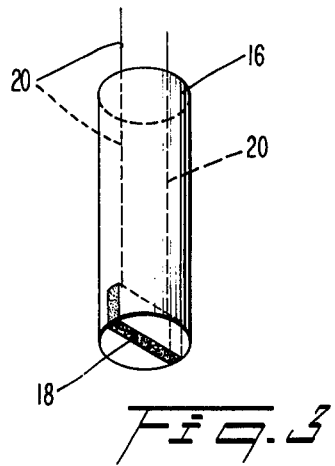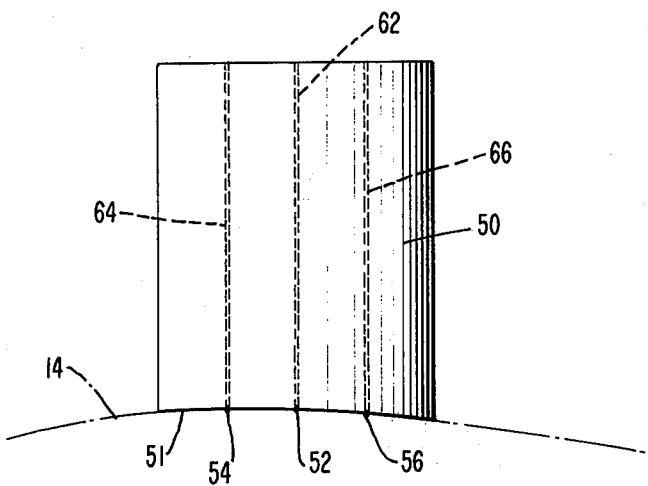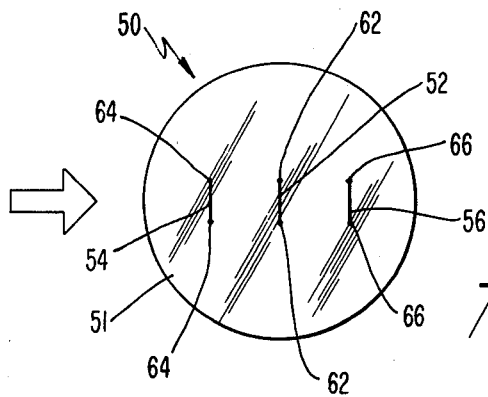

FLOW SEPARATION DETECTOR

ORIGIN OF THE INVENTION

The invention described herein was made in the performance of work under a NASA contract and subject to the provisions of Section 305 of the National Aeronautics and Space Act of 1958, Public Law 85-568 (72 Stat. 435; 42 U.S.C. 2457).

BACKGROUND OF THE INVENTION

The present invention relates to devices for testing for fluid flow separation. In aerodynamics it is understood that the lift acting on a wing of airfoil is due to a difference in pressure between the upper and lower surfaces. This difference in pressure is maintained only if the flow follows the surface. If the fluid flow separates from the surface before reaching the trailing edge, the wing may enter a state of "stall." Separation may be defined as the phenomenon in which the boundary layer of the flow over a body in a moving stream of fluid separates from the surface of the body allowing a condition of low energy turbulent fluid to exist in the region between the body and the smooth flow. The phenomenon of flow separation depends largely upon viscous effects which are usually neglected in the circulation theory of lift. Accordingly in the study of wings, airfoils, and flow surfaces, as well as in certain practical applications, it is important and useful to have an arrangement or device for testing when fluid flow separation occurs, and where it occurs.

One example of a fluid flow separation indicator is described in U.S. Pat. No. 2,431,241 to F. W. Godsey, Jr., on Nov. 18, 1947, for "Stall Warning Indicating Apparatus." One of the defects of such a device as described in the Godsey patent which employs a housing is that the housing in itself disturbs the boundary layer of the flow over a body carrying the housing in the moving stream of fluid, and may itself induce or enhance the chances of separation of this boundary layer from the surface of the body. Some prior devices employ pressure sensing plates to detect pressures and pressure changes. Some employ conduits or passageways connecting orifices at or in the surface under test and then test for fluid flow in the passageways between the orifices, thereby testing for pressure differential between the surface portions at the orifices. These devices also introduce disturbances at the boundary layer and are sometimes not reliable in the resultant indications. Examples of fluid flow detectors, meters, or the like are described in U.S. Pat. Nos. 2,431,241 issued Nov. 18, 1947 to Godsey, Jr. for Warning Indicating Apparatus (noted above), 2,951,659 issued Sept. 6, 1960 to Yoler for Attitude Sensing and Control System, 3,196,679 issued July 27, 1965 to Howland for Fluid No-Flow Detection Apparatus, 3,366,942 issued Jan. 30, 1968 to Deane for Flow Stoppage Detector, 3,400,582 issued Sept. 10, 1968 to Warner for Boat Speed Indicator, 3,677,085 issued July 18, 1972 to Hayakawa for Tandem-Type Hot-Wire Velocity Meter Probe, 3,900,819 issued Aug. 19, 1975 to Djorup for Thermal Directional Fluid Flow Transducer, 3,945,252 issued Mar. 23, 1976 to Fiore for Flow Measuring Apparatus, and 3,922,912 issued Dec. 2, 1975 to Bradbury for Anemometers.

SUMMARY OF THE INVENTION

According to the invention, an arrangement for sensing a fluid flow separation of the boundary layer of the flow over the surface of a body placed in a moving stream of fluid comprises a thermally insulating mounting element, a heater conductor and a pair of thermal conductors, the heater conductor being mounted between the pair of sensor conductors in the direction of fluid flow and the conductors each generally normal to the direction of fluid flow, coextensive in the direction of the conductor axes, and all being mounted at the surface of the mounting element. The mounting element surface is arranged to form without interruption a part of the fluid flow surface.

In operation, if the fluid flow is directed along the line of flow between all three of the conductors, and there is no fluid flow separation, the downstream sensor conductor is heated by the wake from the heat of the heating element above the ambient temperature. The upstream sensor conductor takes a temperature determined by the ambient fluid flow. On the occurence of fluid flow separation, the downstream sensor senses a sudden reduction in heat and the upstream sensor senses a sudden increase in heat at their respective conductors because of the turbulent flow generated in the region of the separation. When the sensors indicate their return to initial conditions, that is an indication of the reattachment of the boundary layer of the flow to the surface. With both sensor conductors, a response indicative of the temperature difference between the two sensor conductors tends to compensate for ambient temperature changes and gives a more certain and definite indication of separation and attachment.

If desired, more than one pair of sensor elements may be placed about the heating conductor thereby providing for the sensing of the direction of the fluid flow as well as the separation. By using multiple sets of elements in or on the body having the surface over which the flow occurs, the location of the separation on the body may also be determined.

BRIEF DESCRIPTION OF THE DRAWINGS

FIG. 1 is a front view of an embodiment of the invention;

FIG. 2 is a bottom view of the embodiment of FIG. 1;

FIG. 3 is an enlarged perspective view of an insert with a sensor conductor for use in the embodiment illustrated in FIGS. 1 and 2;

FIG. 4 is a front view of another embodiment of the invention;

FIG. 5 is a bottom view of the embodiment illustrated in FIG. 4;

DESCRIPTION OF THE PREFERRED EMBODIMENTS

Figure 6:
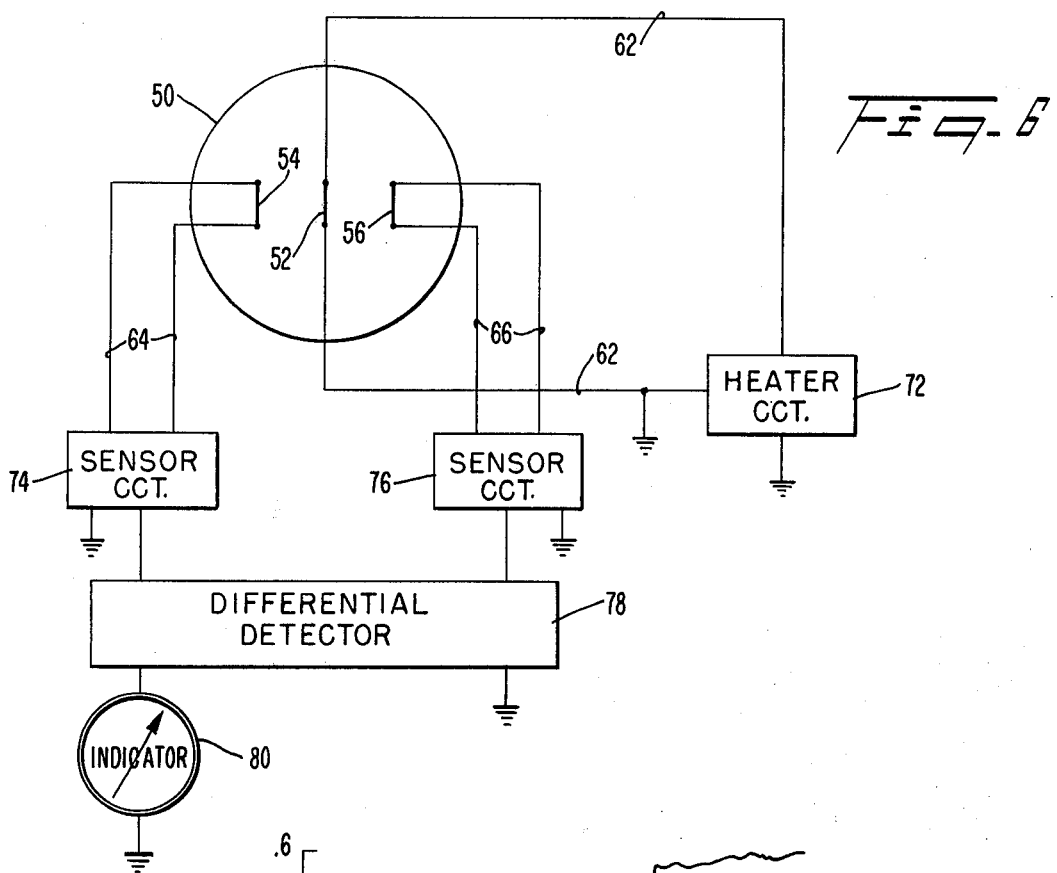
FIG. 6 is a schematic diagram of an electronic circuit in block form such as may be used in a heat sensor suitable for employment in the various embodiments illustrated.

Referring to FIGS. 1, 2, and 3, a thermally insulating body 10 has a surface 12 which is shaped to conform to the surface over which the fluid flow and fluid flow separation is to be sensed. In this instance the surface 12 is shown as concave and spherical, but it might be flat, convex, or any shape that would make it part of the extended surface over which the moving stream of fluid is to flow, as indicated schematically by the extended dashed surface 14. In the element 12 and centrally located is a cylinder 16 carrying at one end a heating conductor 18 to which lead-in wires 20 afford a means of supplying heating current. The thin film conductor 18 may be applied by techniques such as sputtering or evaporating and in this instance may be sputtered platinum. The thermally insulating body 10 may be teflon, Kel-F or other heat insulating material. On opposite sides of the heating conductor 18 with respect to the direction of the expected fluid flow indicated by the arrow are sensor element conductors 22 and 24 respectively. The sensor conductors 22 and 24 are applied to cylinders 26 and 28 respectively and may be constructed in the same manner, but having different resistance values, each as the heating conductor 18 on the cylinder 16 with corresponding lead-in wires for each separately. The heating conductor 18 is arranged to have a resistance of approximately 30 ohms and the conductors on the cylinders 26 and 28 are constructed to have a resistance of 6 ohms each. The ends of the cylinders bearing the conductors such as 18, 22, or 24, although shown as flat, may, if desired, be adapted to the surface 12. In other words the cylinders 16, 26 and 28 bearing the respective conductors on their faces are inserted in the body in such a way that the surface 12 is smooth, continuous and conforms to the curvature of the surface 14 of the body along which the flow separation is to be detected. The lead-in wires 20 and the lead-in wires from the sensor conductors 26 and 28 may be connected to a circuit such as shown schematically in FIG. 6 and described hereinafter. The conductors 18, 22 and 24 have on the surface 12 axes substantially parallel to each other, are coextensive in the axial direction in this example, and the sensor conductors 22 and 24 are on opposite sides of the heater conductor 18 in the direction normal to the axes, i.e., in the direction of the expected fluid flow. The various conductors lie within the viscous sub-layer immediately adjacent the surface 12 during the fluid flow.

Turning now to FIGS. 4 and 5, another embodiment of the invention is illustrated in which a thermally insulating element 50 may have the same form as the thermally insulating element 10 of FIGS. 1, 2, and 3. A heater conductor, in this case a wire 52 and sensor conductors, in this case wires 54 and 56 on opposite sides of the wire 52 are mounted on the thermally insulating element 50. Lead-in wires 62, 64, and 66 are provided respectively for the heater and sensor wires 52, 54, and 56. The lead-in wires 62, 64, 66 are brought in through the thermally insulating body 50 (by insertion through pre-drilled apertures) substantially normally to the surface 51 thereof to make connection to the respective heater circuit for the heater wire 52 and the respective sensor circuits for the sensor wires 54 and 56. There is illustrated schematically in FIG. 6 the heater wire 52, the sensor wires 54 and 56, the respective lead-in wires therefor 62, 64, and 66. In addition, there is shown in block schematic form a heater circuit 72 and respectively sensor circuits 74 and 76 for the sensors 54 and 56. Also illustrated is a differential detector 78 and an indicator 80. As indicated in FIG. 5, the sensor wire 54 is upstream with respect to the fluid flow, indicated by an arrow of the heater wire 52, whereas the sensor wire 56 is downstream of the heater wire 52 with respect to the fluid flow. The conductors 52, 54, and 56 have on the surface 12 axes substantially parallel to each other, are coextensive in the axial direction, and the sensor wires 54 and 56 are on opposite sides of the heater wire 52 in the direction normal to the axes, i.e., in the direction of the expected fluid. The sensor wires 54 and 56 each are a distance of 5 mm. from the heater wire 52.

One way of preparing the heater wire 52 and the sensor wires 54 and 56 may be described as follows. A 0.0025 cm. diameter platinum rhodium heater wire is employed which may be placed directly on the thermally insulating body 50. Similar wires are employed equidistantly on each side, as illustrated, for the sensor wires 54 and 56 which may be of the same material as the heater wire 52, the lead-in wires 62, 64, and 66 having been previously entered through suitably drilled openings. The heater and sensor wires 52, 54, and 56 are connected thereto. Thereafter a thin layer of epoxy (less than 25 microns) is cast on and between the wires and the entire surface then handworked to yield a surface in which the departure from a plane surface as between wires is less than 2.5 microns. It has been found practical to fabricate such a surface with a difference from a plane surface as between the wires of 2 microns. The surface therefore substantially corresponds and conforms to the surface 14 as does the conforming surface 12 of thermally insulating body 10 in FIG. 1, and the conductors all lie well within the viscous sub-layer of any expected fluid flow.

Figure 7:
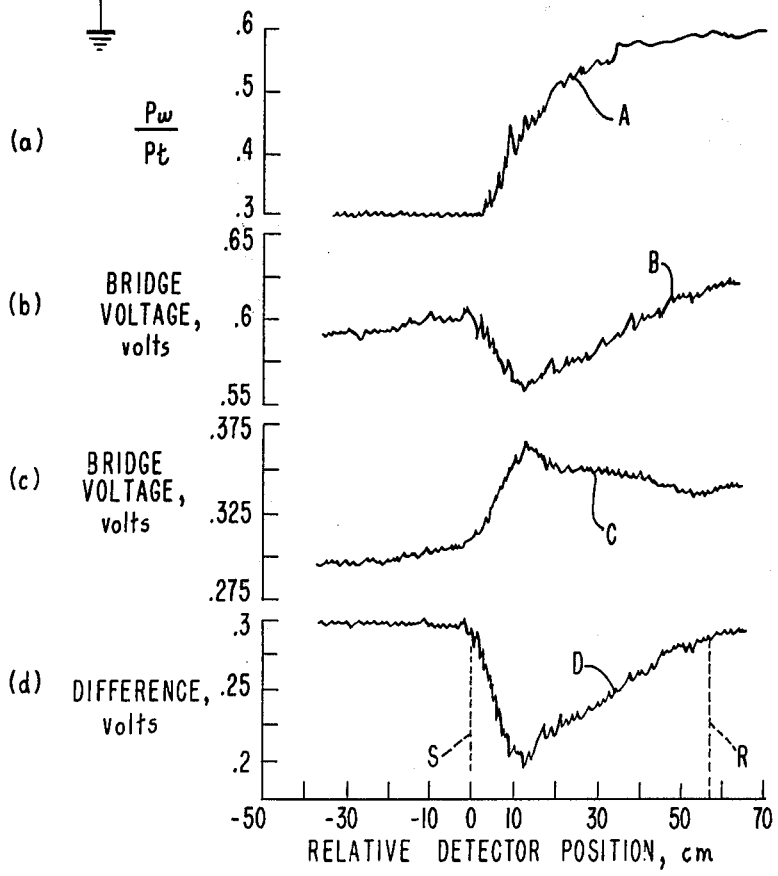
FIG. 7 is a graph useful in explaining the operation of the two embodiments of FIGS. 1 through 6.

The operation of the separation detector may now be explained more fully in connection with FIGS. 6 and 7. The separation detector constructed as illustrated and described in connection with FIGS. 4 and 5 was tested in a test section of tube which was 2.69 meters in length, 24,77 cm. in internal diameter and carrying a shock generator at one end. An air flow entered at the other end exited at the shock generator end. This air flow had a Reynolds number of between $10^5$ and $10^6$. Several separation detector ports were located at different positions in the test tube. A normal shock wave could be positioned at any station inside the test section by means of hollow, cylindrical shock wave generators of different diameters inserted coaxially into the exit end. Several separation detectors were constructed as described and placed on the surface with transverse curvature to fit the wall of the circular test section at the seven positions. The center detector wire was heated to about 200° F. (about 100° C.) The adjacent sensors were maintained at about 20° C. As a result of these tests, the response of a separation detector such as that described in connection with FIGS. 4 and 5 is illustrated in FIG. 7. Along the abscissa is plotted the relative detector position in centimeters with respect to the point of separation indicated as S and the point of reattachment indicated as R. The point of separation is always taken as the zero or origin point for the curves. Negative distances from the separation point on the abscissa indicates that the detector is upstream of the shockwave, and positive abscissa represents the position of the detector downstream of the shockwave.

The first curve A in FIG. 7 in the portion (a) is the ratio of the wall static pressure at the detector location to the total pressure in a stagnation chamber. The second or B curve or portion (b) of FIG. 7 is a graph of the volts produced by the upstream sensor circuit at the lead-in wires 66 to maintain the same current through the sensor element 56. Such a voltage indicates the response of the sensor to temperature changes, or is a measure of the temperature change, because as the sensor conductor cools its resistance increases, and a greater voltage is required to cause the same current flow; conversely if the sensor or conductor becomes warmer its resistance decreases and a lesser voltage is required to cause the same current flow. At the same time the curve C in portion (c) indicates the similar voltage generation for the downstream wire 54 on the lead-in wires 64.

The circuits 74, 76 and 78 each may be, for example, an anemometer circuit such as manufactured and sold by the Disa Elektronik A/S DK-2730, Herlev, Denmark, as their 55-M system, with interchangeable constant temperature-constant current bridges. As is understood, for use as a constant temperature device, calibrate the resistance-temperature characteristic of conductor 52, then set the resistance of a leg of the bridge circuit accordingly, and the circuit will maintain the conductor 52 at the desired temperature. For use as a sensor, with conductors 54 and 56, use a very small current through the sensor conductor, for example 3 milliamperes. Again knowing the resistance-temperature characteristic of the sensor conductors, the bridge unbalance measures the voltage (and therefore resistance and thus temperature) across the sensor conductors which gives a measure of the conductor temperature. Other such circuits are known. If desired the sensor circuits 74 and 76 may be combined into a single circuit, for example a bridge circuit arranged with the two sensor conductors 54 and 56 in different legs of the bridge circuit so that bridge circuit unbalance detects or reflects the difference in the resistance of the two conductors more directly than by the circuit of FIG. 6. Such bridge circuits are exemplified in some of the patents cited above.

Finally, the difference shown as D in part (d) of FIG. 7 in the two voltages B and C may be obtained by differential detector 78 which will tend to expand or emphasize the sudden departure in voltages (and temperatures) which is apparent at or near the separation point, and applied by the differential detector 78 to an indicator 80 which may be a simple volt-meter. It is apparent from the curves that by constructing gauges such as those described in which the wires are of a thickness that remain within the thermal boundary layer one achieves a reliable sensor which does not interfere in any substantial way with the air stream. The sensor conductors should of course be sufficiently close to the heater conductor that the downstream conductor is warmed by the wake. The difference voltage, or sensing the temperature difference between the two sensor conductors, tends to cancel out and compensate for the ambient temperature of the fluid in its free flow.

Figure 8:
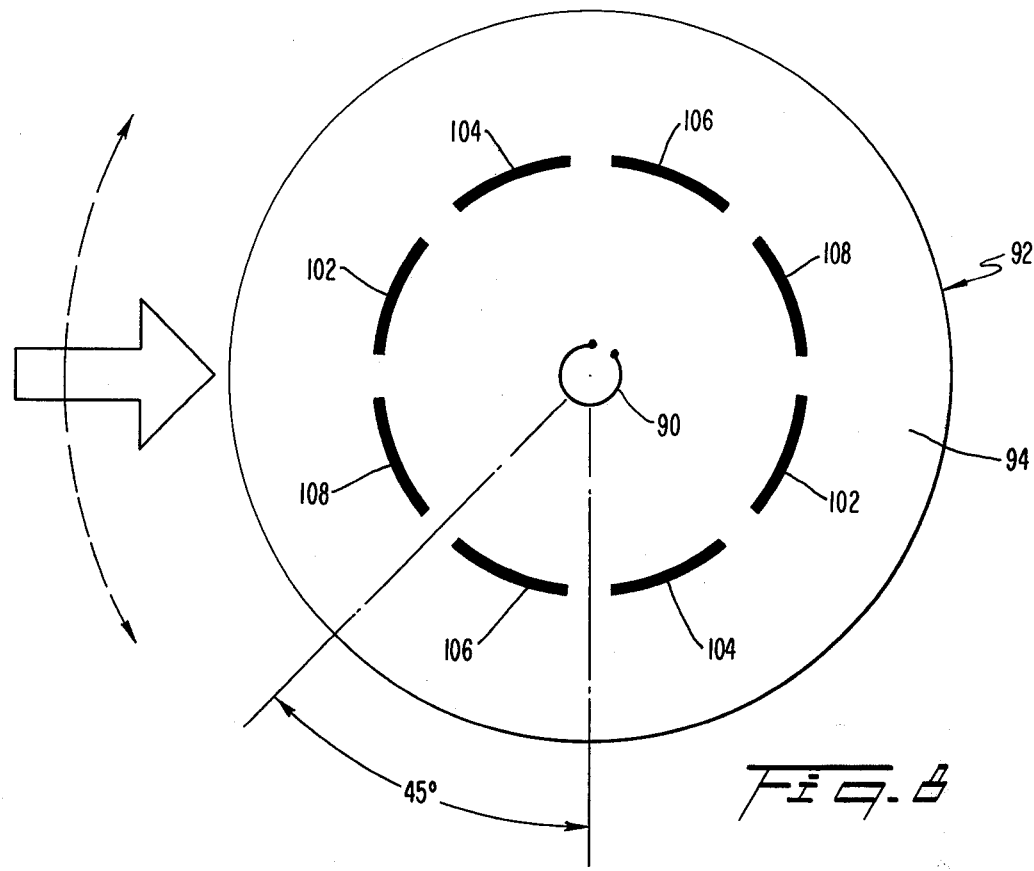
FIG. 8 is a bottom view of still another embodiment of the invention having a single heater element and multiple pairs of sensor conductors.

Referring now to FIG. 8, there is illustrated an arrangement in which a central heater wire 90 is provided on the surface of a thermally insulating body 92. The body 92 may be similar to the thermally insulating bodies 10 and 50 heretofor described. The heater wire 90 at the surface of the body 92 may take the form of a substantially completed circle or a substantially completed octagon or the like. On the boundary surface 12 of the body 92 which blends into or conforms to the surface 14 of the foil or the like from which separation is to be tested, a plurality of pairs of sensor conductors are placed. Thus the thermal sensors 100 are placed in pairs on opposite sides of the heater 90 on the surface 94 in approximately an arc of 45°. A second pair of sensors 102 on opposite sides of the center of the heater wire 90 are located on the surface 94 in the next 45° sector clockwise of the first pair of sensors 100. A third pair of sensors 104 occupy the next pair of 45° sectors in the clockwise direction and a final pair of sensors 106 occupy the following and final 45° sector in a clockwise direction from the third pair. Each pair occupies approximately 45° sectors measured along the circular axis of each conductor on both sides of the center of the heater wire 90 on the surface 94. The heater wire has a temperature well above the expected ambient temperature of the surrounding fluid, for example some 200° F. above the ambient or about 100° C. Accordingly, from whichever direction the fluid flow occurs over the surface 94, one of the detectors of one of the pairs 100, 102, 104, or 106, will be in the downstream direction of the flow to receive heat in the wake and will be warmed because they lie within the thermal boundary layer of that wake. As a consequence the direction of the flow can be sensed by determining the differential temperature of that pair of sensors, and one may also receive an indication of whether or not there is a separation. If the temperature differential is modest and conforms to that which, by reason of previous tests or calibration indicates that there is no separation, then the flow is attached and there is no separation at the test surface. If there is a marked departure from these conditions indicating that the sensors have undergone a substantial temperature change, the downstream sensor having cooled and the upstream sensor having warmed from the previously calibrated condition, then it will be understood that a separation has occurred. Accordingly, one may determine not only whether or not there is a separation but also the direction of flow.

Figure 9:
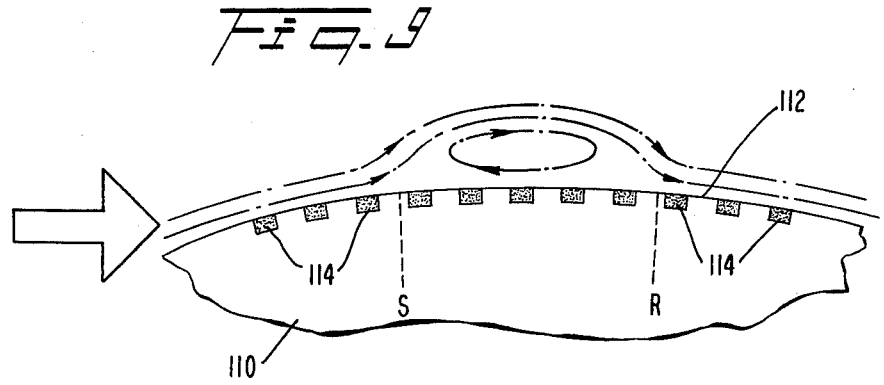
FIG. 9 is a schematic side view of a part of an airfoil with multiple pairs of sensors according to the invention arranged for use in determining the area of separation of fluid flow over a surface of the airfoil.

Referring now to FIG. 9, an airfoil 110, for example for purposes of testing may have appropriately placed detectors 114 with their sensing surfaces conforming to the surface 112 of the airfoil 110. The detectors 114 each may be similar to one of the detectors already described in FIGS. 1 to 3 or FIGS. 4 and 5. The detector 114 may be arranged in a linear or rectangular array. It will be apparent that given the direction of fluid flow indicated by the arrow the extent and location of points of separation such as indicated by the dotted line S, and of reattachment such as indicated by the dotted line R may be readily ascertained. In the example indicated the air flow lines are drawn and the loop and the area within the loop indicate the area of separation and turbulence whereas the regular flow lines indicate the areas of attached flow.

Reference may be made to the following publications in which the invention or an embodiment thereof was disclosed. ICIASF 1975 Proceedings; I.E.E.E. Publication 75 CHO 993-6 A.E.S., Sept. 1975, and AIAA paper #76-161, Jan. 1976. Reference may also be made to NASA Technical Memorandum TM X-62,465 entitled "A Hot-Wire Surface Gage for Skin Friction and Separation Detection Measurements" by Morris W. Rubesin, Arthur F. Okuno, George G. Mateer and Aviel Brosh.

In view of the foregoing it will be apparent that separation detectors according to the invention provide an improved and superior means of detecting the direction of air flow and the areas and points of separation from a flow surface. Such a detector may be small in size, easily conforms to unusual curved surfaces, is simple and inexpensive. Moreover it has a fast dynamic response.

What is claimed is:

1. A flow separation detector or the like comprising a body with a low thermal conductivity, said body having a surface adapted to be aligned with and become part of the surface from which the flow separation is to be detected, a heater conductor having a longitudinal axis, two temperature sensing conductors each having a longitudinal axis, said conductors being mounted substantially flush with said body surface so as to minimize flow interference, said temperature sensing conductors being mounted on opposite sides of said heater conductor in the direction of the flow to be detected, means for heating said heater conductor, means for measuring the temperature differential between said temperature sensing conductors, said differential being a function of the flow separation.

2. A flow separation detector as claimed in claim 1 wherein said conductor longitudinal axes are parallel, said sensor conductors are substantially coextensive in the axial direction, and equidistant on opposite sides of the heater conductor in the direction normal to said axes.

3. A flow separation detector as claimed in claim 2 wherein each of said conductors is a wire.

4. A flow separation detector as claimed in claim 2 wherein each of said conductors is a thin film.

5. For sensing a fluid flow separation along a surface, the combination comprising a thermally insulating element having a continuous surface for blending into and forming a part of the said fluid flow surface, a heating wire, means for applying a heating current to said wire, two thermal sensors each having a separate respective conductor the temperature of which is sensed by its respective sensor, all of said conductors being mounted on said element at said element surface and having axes parallel to each other and perpendicular to the direction of fluid flow, the said thermal sensor conductors being on opposite sides, in the sense of said flow direction, of said heating wire.

6. A combination as claimed in claim 5 wherein said thermal sensor conductors are equidistant from said heating wire.

7. A combination as claimed in claim 6 wherein each sensor conductor is arcuate and said sensor conductors are arrayed in a circle around said heating conductor.

8. A combination as claimed in claim 6 wherein there are four pairs of sensor conductors and each sensor conductor approximately subtends a 45° angle.

9. For sensing a fluid flow separation along a surface, the combination comprising a thermally insulating element having a continuous surface for blending into and forming a part of said fluid flow surface, a conductor to be heated, means for applying a heating current to said conductor, a plurality of pairs of thermal sensors, each having a separate respective conductor the temperature of which is sensed by its respective sensor, all of said conductors being at said element surface, the conductors of each pair being equidistant and on opposite sides of said conductor to be heated.

* * * * *